United States Patent [19]

Koster

[11] Patent Number: 4,744,102
[45] Date of Patent: May 10, 1988

[54] CROSSBAR LINE HUNTING ARRANGEMENT

[76] Inventor: Frederick H. Koster, P.O. Box 97, Granite Springs, N.Y. 10527

[21] Appl. No.: 823,030

[22] Filed: Jan. 27, 1986

[51] Int. Cl.$^4$ ............................................. H04M 3/42
[52] U.S. Cl. .................................... 379/215; 379/277
[58] Field of Search ............... 379/215, 201, 202, 203, 379/204, 205, 206, 277

[56] References Cited

U.S. PATENT DOCUMENTS

| | | |
|---|---|---|
| 2,585,904 | 9/1952 | Busch . |
| 3,133,995 | 5/1964 | Zarouni ................................. 179/84 |
| 3,278,692 | 10/1966 | Bean ...................................... 179/18 |
| 3,320,367 | 5/1967 | Krom .................................... 179/18 |
| 3,479,465 | 11/1969 | Masucci ................................ 179/18 |
| 3,532,831 | 10/1970 | Whitney .............................. 379/215 |

OTHER PUBLICATIONS

Bell Laboratories record, Jul. 1950, p. 298 "Number Group Frame for No. 5 Crossbar" by O. J. Morzenti.
Electrical Engineering, Aug. 1950, p. 679, "No. 5 Crossbar" by F. A. Korn and J. G. Ferguson.
Bell Laboratories Record, Nov. 1950, p. 502, "No. 5 Crossbar Marker" by A. O. Adam.

*Primary Examiner*—James L. Dwyer
*Attorney, Agent, or Firm*—Pennie & Edmonds

[57] ABSTRACT

An arrangement for improved two-line hunting in crossbar switching systems is disclosed where the two lines are located in the same line link frame vertical group and vertical file. When the marker determines that the primary line is busy the marker is caused to recycle and to reseize the number group and retranslate the directory number of the primary appearance. When the marker re-obtains the equipment location information for the primary line appearance, it directly modifies one element of the translation information, illustratively, the horizontal group number, to obtain the equipment location of the auxiliary line appearance. Since the marker directly modifies the translation information furnished by the number group it is not necessary to assign a separate directory number to the auxiliary line appearance. The direct modification of the equipment location is performed by providing a selectively operable chain path in the operating path of the horizontal group seizure relays.

8 Claims, 4 Drawing Sheets

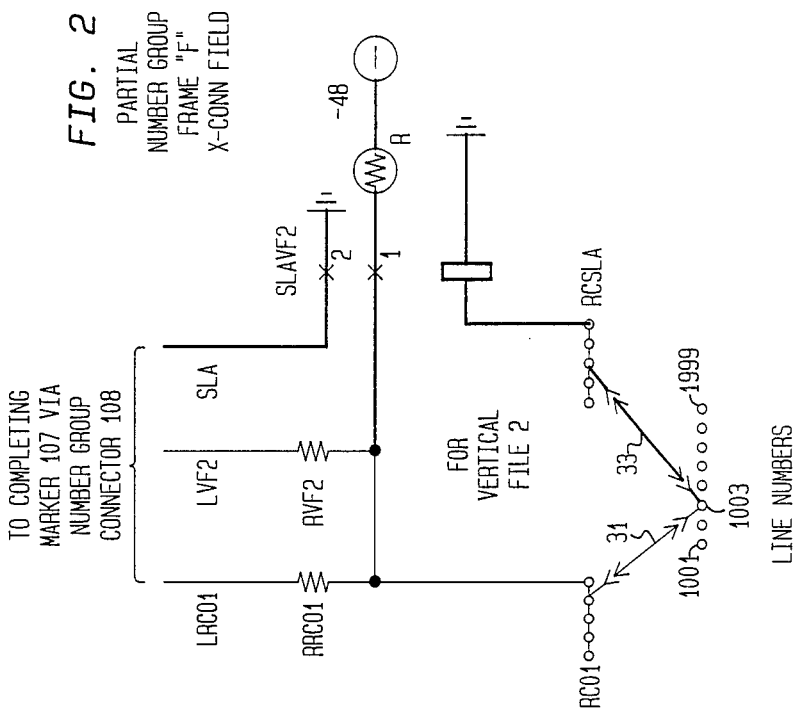
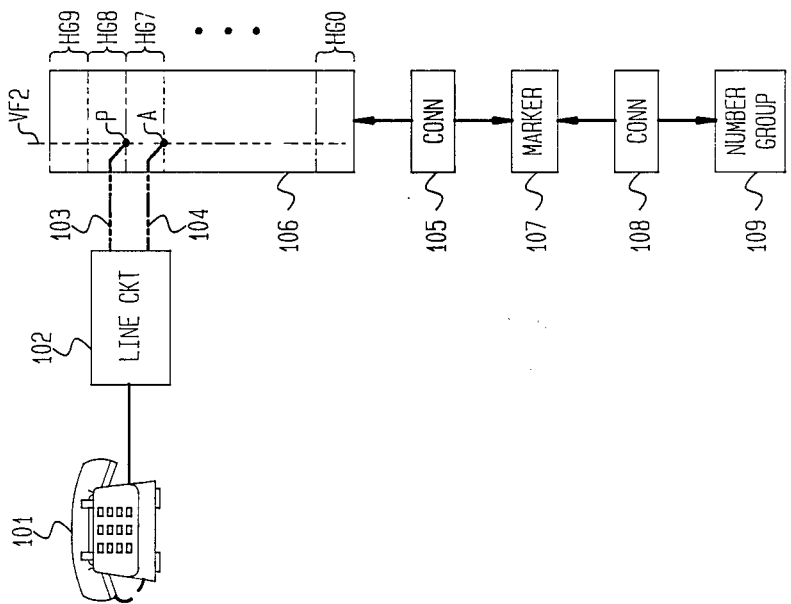

PARTIAL COMPLETING MARKER CIRCUITRY

FIG. 4 — PARTIAL COMPLETING MARKER SEQUENCE CHART

CROSSBAR LINE HUNTING ARRANGEMENT

FIELD OF INTEREST

This invention relates to the provision of two-line hunting in crossbar switching systems and, more particularly, to an arrangement which obviates the need to assign more than one directory number to the line appearances.

BACKGROUND OF THE ENDEAVOR

The advent in 1964 of program-controlled switching systems, such as the lESS manufactured by the Western Electric Co. and described in the September 1964 issue of the Bell System Technical Journal, has increased the demand for enhanced calling services including add-on, call forwarding and call waiting. These services are relatively easy to provide in stored program controlled switching systems because it is merely necessary to load a description of the service functions to be provided into the memory unit of the system. As the use of such stored program controlled switching systems has become more widespread the public has become accustomed to expect that such services will be available everywhere. This expectation extends as well to those customers who are still served by electromechanical offices of the local crossbar type. Unfortunately, it is not always economically attractive to provide enhanced services to customers served by crossbar equipment and it also may be impractical to immediately replace all existing crossbar offices with stored program controlled equipment.

The local crossbar switching system was introduced shortly after World War II and is disclosed in A. J. Busch U.S. Pat. No. 2,585,904 issued Feb. 19, 1952 as well as in a number of articles which have appeared in the Bell Laboratories *Record,* beginning in October 1949. For purposes of understanding the crossbar technology context of the present invention, the following *Record* articles are of interest: "No. 5 Crossbar Marker" by A. O. Adam, November 1950, page 502; "Number Group Frame for No. 5 Crossbar" by O. J. Morzenti, July 1950 page 298 as well as the article entitled "No. 5 Crossbar" by F. A. Korn and J. G. Ferguson which appeared in *Electrical Engineering,* August 1950, page 679.

In the prior art it had been proposed to provide enhanced calling services, such as call waiting, in crossbar systems by providing each line to be accorded this service with a line circuit having an auxiliary appearance on the crossbar line link frame. Examples are shown in M. E. Krom U.S. Pat. No. 3,320,367 issued May 16, 1967 and in A. Zarouni U.S. Pat. No. 3,133,995 issued May 19, 1964. When a line having the auxiliary line appearance feature is called and is found to be busy on a first call, the crossbar "marker" (see next paragraph) would connect the second call to the auxiliary line appearance of the called line and a distinctive tone signal would be heard by the called subscriber while regular ring-back tone would be provided to the calling party making the second call. The busy subscriber may then flash the telephone switchhook in response to the distinctive tone to hold the first call and take the second call. The busy subscriber may then return to the first call by flashing again, etc.

The local crossbar switching system marked a great departure from prior switching systems in that the directory number that could be assigned to a subscriber's line was independent of the physical location of that line in the crossbar equipment. The flexible assignment of directory numbers was achieved through the use of an electromechanically changeable translator known as a number group frame. This translator received the called directory number from the common control device called a "marker" and, in turn, furnished the marker with the physical location of the called line in terms of that line's line link frame number, vertical group, horizontal group and vertical file information. The marker then completed a connection between the calling and called line.

In retrospect, it may now be appreciated that the number group frame performed a translation function which may be roughly compared to the similar usage of the memory unit in a stored program controlled switching office. The electromechanical number group frame, however, is capable of performing only a very few of the myriad translation process that can be accomplished through the use of electronic memory storage and is just not "reprogrammable" to store sophisticated translations. For example, as described in H. S. Pat. Bean U.S. Pat. No. 3,278,692 issued Oct. 11, 1966, the number group may be modified so that it furnishes the marker not only with the equipment location of the called line but also with the units digit of the directory number for the called line's auxiliary line appearance. When the marker determines that the called line's primary equipment location is busy, the marker would re-cycle and seize the number group again, this time replacing the units digit of the originally called directory number with the units digit that it received from the number group on the first seizure. The second call would then be connected to the auxiliary line appearance.

While the number group allows flexible assignment of directory number to equipment locations, the above-described prior art crossbar systems nevertheless requires that each line equipment location have a corresponding (though not necessarily published) directory number. The requirement that every line appearance, including the auxiliary line appearance, must have a directory number is particularly disadvantageous in areas where the available pool of directory numbers is nearing exhaustion. Because call-waiting service is employed at the point of call termination rather than at the point of call origination, the effect of the required withdrawal of a directory number is felt at the terminating office. Where that office may be "short" of available directory numbers the telephone company may be reluctant to "throw away" a scarce directory number that could be assigned to usage-sensitive call origination and dedicated that number to enhanced call completion service for which only a small monthly fee is charged to the called subscriber desiring the service.

As further pointed out in E. D. Masucci U.S. Pat. No. 3,479,465 issued Nov. 18, 1969, the two-line hunting arrangement of the Bean patent is employed most efficiently only where the two lines have identical directory numbers except for the units digit. Thus, if ten consecutive directory numbers in a particular tens block of numbers are already assigned it will not be possible to provide the necessary directory number for the auxiliary appearance required for two-line hunting purposes. In other words, although the primarily line appearance and the auxiliary line appearance have the same published directory number as far as subscribers are concerned, the implementation of two-line hunting required that an additional directory number be removed from the reservoir of directory numbers available for assignment to other subscribers. The Masucci patent disclosed the use of a further number group frame for the purposes of providing line hunting capability in a PBX—an arrangement suitable only where a very large, concentrated number of lines are to be accorded hunting service. The provision of call waiting service for individual subscribers, however, would not justify the financial investment required to provide the auxiliary number group disclosed in the Masucci patent for large PBXs.

Accordingly, it is an object of the present invention to provide an economical method of modifying crossbar offices so that enhanced calling services, such as call waiting, may be effected without requiring the withdrawal of a directory number from the assignable pool and without the constraint of the tens block restriction which priorly characterized two-line hunting arrangements.

SUMMARY OF THE INVENTION

In accordance with the principles of the present invention, a subscriber's line which is to be accorded an enhanced service, such as call-waiting service, is identified by the number group translator as having an auxiliary line appearance on the crossbar switch frame. Advantageously, the auxiliary appearance lies in the "shadow" of the line's primary appearance, that is, it lies in the same vertical group and file but one horizontal group below that of the primary line appearance on the crossbar switch frame. The indication that the line has an auxiliary appearance is registered in the marker incident to the marker receiving the normal translation information from the number group frame. This indication is brought into play when the marker determines that the called line is busy. The marker at this point recycles and, instead of returning busy tone to the calling line, reseizes the number group frame to retranslate the originally-called directory number in order to re-obtain the normal translation data, i.e., the line link frame number, vertical group, horizontal group, and vertical file information which it obtained on the first seizure of the number group. On the re-seizure, however, the re-cycled marker modifies the horizontal group number to identify the physical level of the shadow line on the crossbar switch frame rather than the physical level of the primary line. Advantageously, this is accomplished in the marker by decrementing the horizontal group number furnished it by the number group. An auxiliary chain path is provided among the windings of the horizontal group seizure relays (HGT-) so that instead of the seizure relay being operated that corresponds to the horizontal group number relay (HGN-) the seizure relay corresponding to the horizontal group one number lower is operated. The completing marker then completes the call to the equipment location indicated by the decremented horizontal group translation. Since the equipment location of the "shadow line" is automatically generated by the marker from the equipment location furnished by the number group, no directory number need be assigned to the shadow line.

BRIEF DESCRIPTION OF THE DRAWINGS

The invention will be described with reference to the drawing, in which:

FIG. 1 shows a line circuit having a primary and auxiliary (shadow) line appearance on the switches of a crossbar line link frame;

FIG. 2 shows a portion of the number group translator;

DETAILED DESCRIPTION

Figure 3:
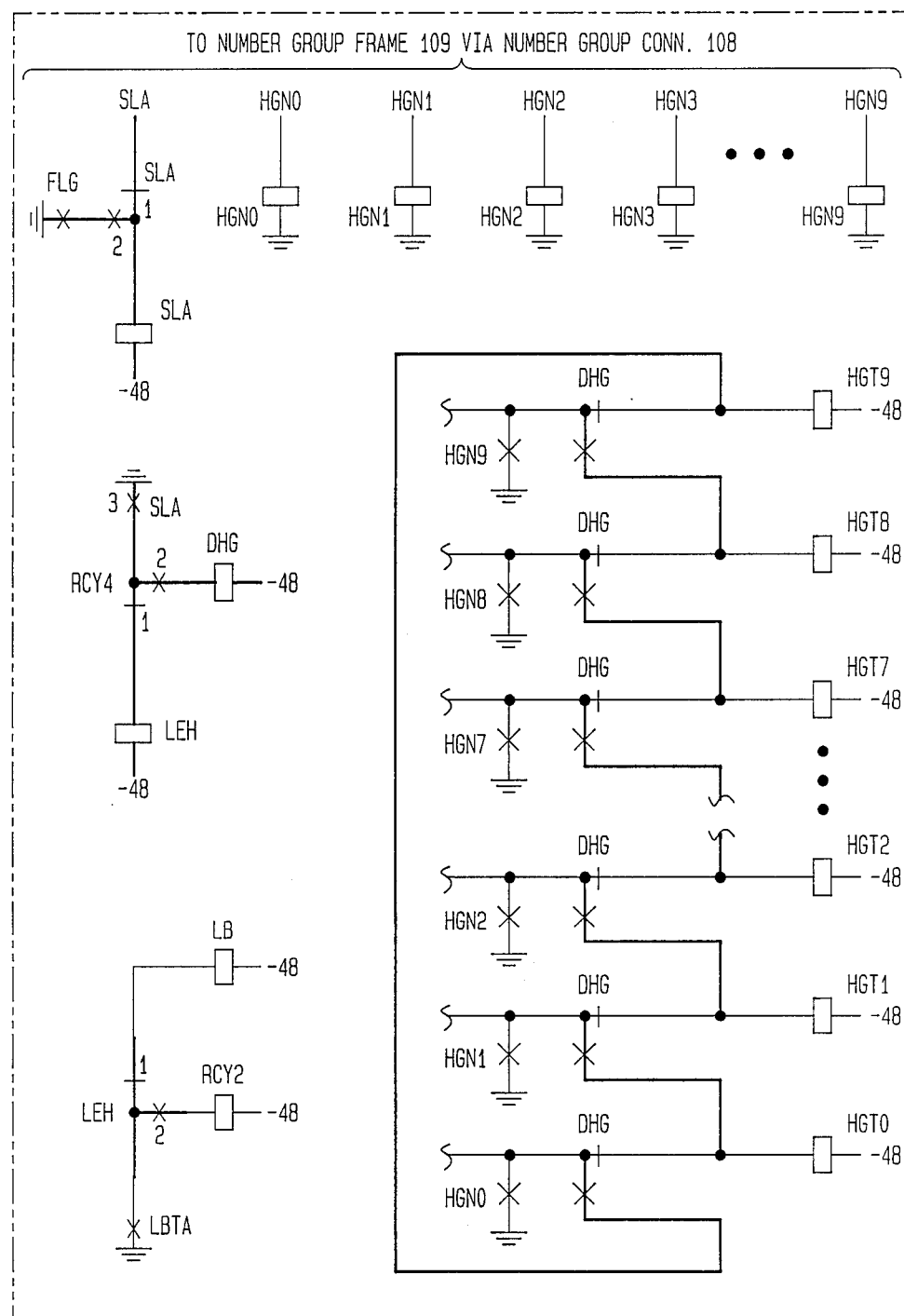
FIG. 3 shows a portion of the marker circuitry.

In FIG. 1, telephone 101 is served by central office equipment including a line circuit 102 and a line link frame (LLF) 106. While for the sake of simplicity FIG. 1 has been illustrated in terms of a single line circuit with two appearances, it should be understood that my invention is applicable as well where appearances P and A are assigned to individual lines comprising a two line hunt group. As is well known, a line link frame is composed of a stacked array of crossbar switches, HG9 through HG0, each such switch having the capability of connecting a line appearing in a particular vertical group and file to a horizontal path (not shown). Line circuit 102 is shown having two connection cables 103, 104 to line link frame 106, each cable terminating therein in the respective line appearance P, A.

Connections within the crossbar switches HG0 through HG9 of line link frame 106 are controlled by marker 107 which obtains access to number group translator 109 via connector 108 as described in the aforementioned patent to A. J. Busch.

In the illustrative embodiment of my invention, line link frame appearance P from line circuit 102 shall be referred to as the primary line appearance and shall be illustrated as being connected in vertical file VF2 of vertical group 3 (not explicitly depicted) of crossbar switch HG8. Line link frame appearance A from line circuit 102 shall be referred to as the auxiliary appearance and, in accordance with the principles of my invention, shall be connected also in vertical file VF2 of the same vertical group 3 of line link frame 106, but in crossbar switch HG7, one physical switch location lower than that of the primary appearance. If, prior to being accorded the enhanced service herein contemplated, telephone 101 had been assigned to appearance P in line link frame 106 by means of a single-ended line circuit (i.e., one lacking an auxiliary appearance 104) and some other telephone (not shown) had been assigned to appearance A which is not to be part of telephone 101's two line hunt group, it is simply necessary to relocate such other telephone to a vacant line appearance elsewhere in the office. Such relocation will not, of course, require any changes in the directory numbers of either telephones 101 or the other telephone.

When a telephone, such as telephone 101, is called by some remote telephone (not shown) marker 107 is furnished the directory number of telephone 101 as described in the aforementioned Busch patent. Marker 107 then furnishes the last four digits of that directory number, say 1003, to number group translator 109. In the number group, see FIG. 2, circuitry (not shown) applies battery to line number terminal 1003 corresponding to the called directory number. For a telephone not being accorded enhanced service terminal 1003 would be cross-connected via jumper 31 to terminal RCO1 identifying the ringing combination appropriate to ring the called telephone. Battery applied to terminal RCO1 would then be continued via resistor RRCO1 to lead LRCO1 and via resistor RVF2 to lead LVF2. These leads continue through connector 108 to marker 107 where, as described in the Busch patent, the resistance battery on lead LRCO1 identifies the appropriate ringing combination and the resistance battery on lead LVF2 identifies the vertical file of the called telephone.

In accordance with my invention, however, when telephone 101 is to be accorded enhanced service by being equipped with a dual appearance line circuit 102, jumper 31, FIG. 2, is disconnected. Instead, a jumper 33 is provided to connect line number terminal 1003 to new circuitry including terminal RCSLA and relay SLAVF2 which, together with other circuit modifications, are shown in heavy weight ink in FIG. 2. Relay SLAVF2 operates in response to the appearance of battery on terminal 1003 and, at its adjacent make contact 1, applies resistance battery to both leads LRCO1 and LVF2 corresponding to that provided by former jumper 31. At its operated make contact 2 relay SLAVF2 applies ground to new lead SLA which is continued through connector 108 to marker 107. Activation (grounding) of lead SLA will indicate to marker 107 that the called telephone is assigned a shadow line appearance on the crossbar switch line link frame.

Referring now to FIG. 3, there is shown that portion of the completing marker required to implement my invention. Prior art circuitry is shown in normal line weight while new circuitry is drawn heavily. Incident to completing a call to the same directory number, 1003, assumed in the description of FIG. 2, the marker will have been furnished translation information (line link frame number, horizontal group number, vertical group number and vertical file number) which identifies the equipment location of the called line's primary appearance P on line link frame 106. Since appearance P lies in horizontal group 8 of the crossbar switches of frame 106, horizontal group number relay HGN8 (not explicitly shown) of relays HGN0 through HGN9 of the marker (upper portion of FIG. 3) will be operated, along with other completing marker relays not necessary to be described.

When the completing marker accesses a called line and finds the line to be busy, prior art relay LBTA (winding not shown) operates as disclosed in the aforementioned Busch patent. A set of make contacts of relay LBTA are shown in the lower left hand portion of FIG. 3, and, ordinarily, would cause relay LB to operate to return busy tone to the calling subscriber. However, in accordance with my invention, back contacts 1 of a new relay LEH are inserted in the operating path of prior art relay LB. If the number group has applied ground, as previously described, to lead SLA in FIG. 2 because the busy line belongs to a two line hunt group, the ground will be continued over lead SLA which appears at the upper left hand portion of FIG. 3. The ground on lead SLA causes relay SLA to operate over its back contacts 1. Relay SLA operated at its contacts 3 causes relay LEH to operate over back contacts 1 of relay RCY4. Relay LEH operated at its back contacts 1 opens the path for operating relay LB. Accordingly, busy tone is not returned to the calling subscriber.

The operation of relay LEH at its make contacts 2 completes an operating path for prior art relay RCY2 which operates over the ground made available over operated contacts of relay LBTA, aforementioned. Operation of relay RCY2 causes the marker, in known fashion, to release all of the translation information associated with the called number, (i.e., line link frame number, vertical group number, horizontal group number and vertical file number). When the translation information is released, prior art relay RCY4 (windings not shown) is operated in the normal manner. Relay RCY4 in accordance with my invention is, however, provided with an additional set of transfer contacts 1, 2. Operation of the transfer contacts 1, 2 of relay RCY4 removes the operating ground for relay LEH and applies it to the winding of relay DHG. The release of relay LEH restores a path for operating relay LB which will operate if the line which the marker attempts later to reach is found to be busy.

The recycling of the marker initiated by the operation of prior art relay RCY2 now causes the marker to reseize the number group frame, as described in the aforementioned Busch patent. The number group again furnishes the marker with the same translation information for the originally called directory number (1003, FIG. 2). The translation information again causes horizontal group number relay HGN8 to be operated. If relay DHG had not been operated, the operation of relay HGN8 would cause the corresponding horizontal group seizure relay HGT8 to operate to again cause the marker to ascertain the busy/idle state of primary line appearance P. With relay DHG operated, however, the ground operating path provided by the operated HGN8 relay contact is transferred away from the winding of the associated HGT8 relay and transferred to the winding of relay HGT7 immediately below. Operation of relay HGT7 causes the marker to seize the auxiliary line appearance A of the called line (see FIG. 1) which is located located in horizontal group 7 of the crossbar switches on line link frame 106. Thus the "shadow" line appearance is called. If the shadow line appearance is not busy, the calling party will be connected to that appearance and call waiting tone may be returned to telephone 101 by line circuit 102, as described in the aforementioned Zaroni or Masucci patents. If the shadow line is found to be busy, relay LBTA will be operated as previously described, causing relay LB to be operated and to return busy tone to the calling subscriber.

Figure 4:
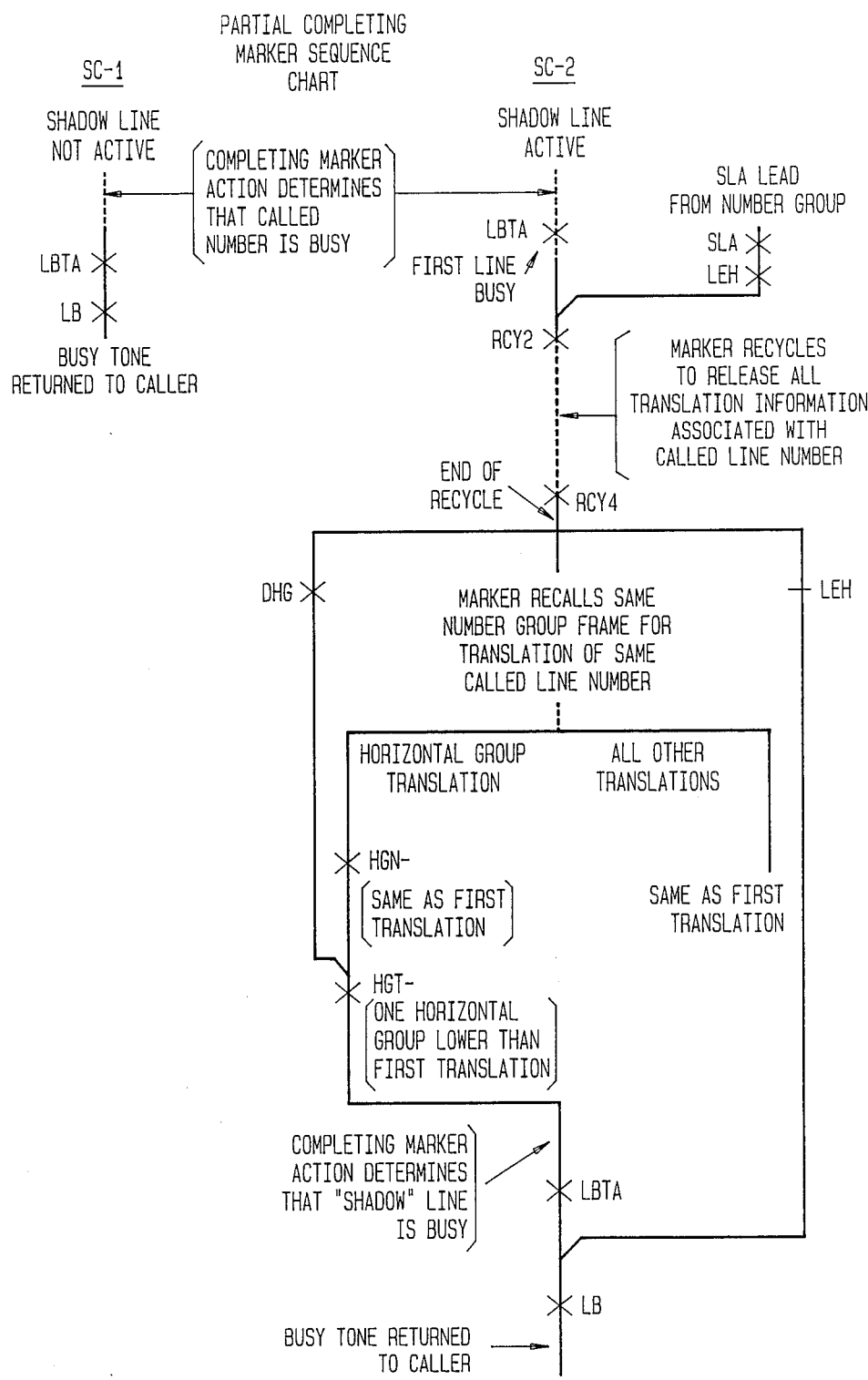
FIG. 4 is a sequence chart.

Referring now to FIG. 4, a flow chart is shown describing the aforementioned operations. Sequence chart SC1 shows the operation of relays LBTA and LB occurring for a line that it not part of a two line hunt group when the completing marker determined that the called line is busy. Sequence chart SC2 shows the marker operations which occur in accordance with my invention to serve lines forming a two line hunt group.

Figure 5:
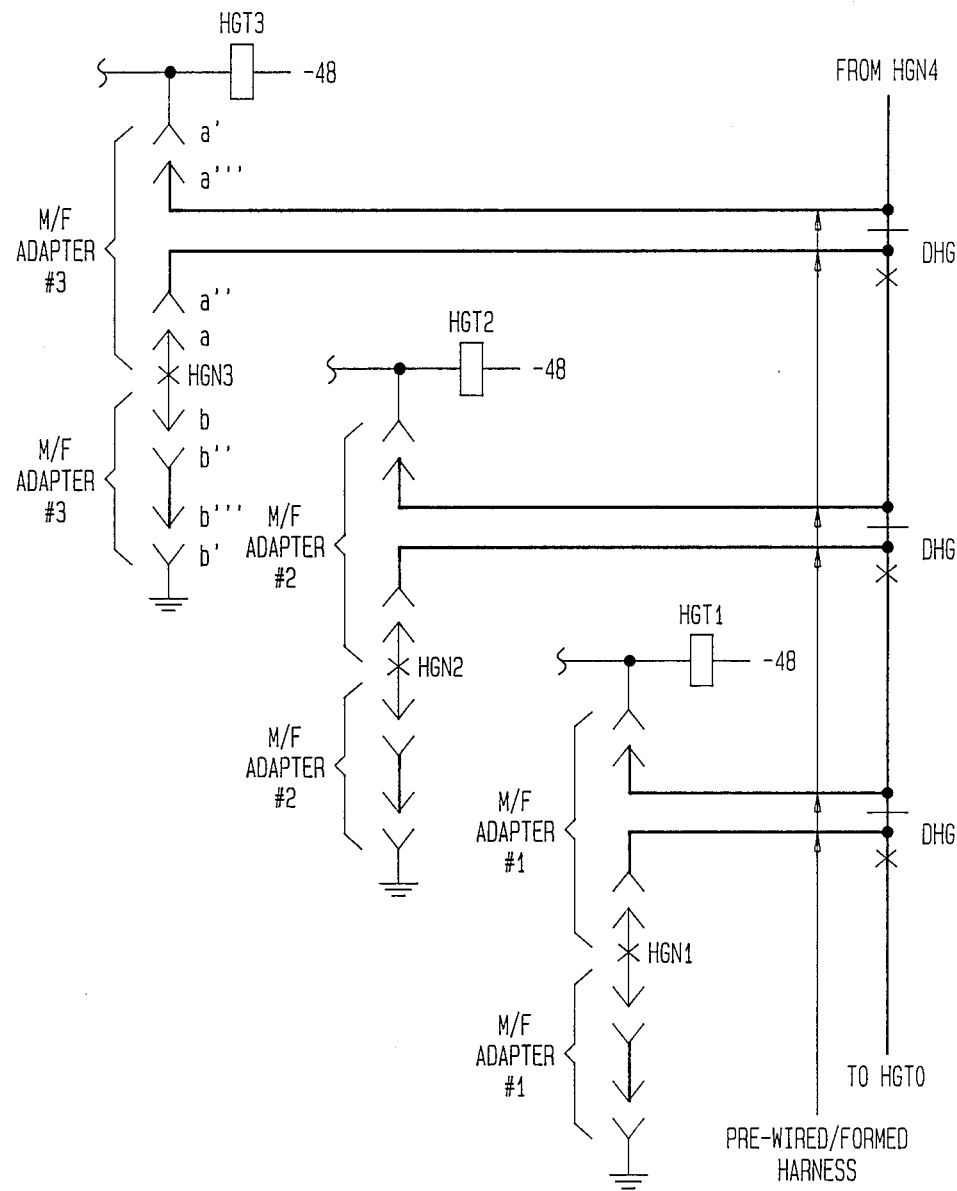
FIG. 5 shows an advantageous arrangement for implementing modifications to the marker circuitry.

Referring now to FIG. 5, there is shown a preferred way of wiring the completing marker to implement a portion of the desired circuitry changes. Circuitry for only three of the HGN- and HGT- relays previously depicted at the right hand side of FIG. 3 is shown. The horizontal group number relays HGN0 through HGN9 of the marker are typically of the plug-in type. Each of these relays is removed from its socket and in its place a corresponding male/female adapter is to be inserted. The HGN0-9 relays are then reinserted into their respective adapters. For example, pins a and b of plug-in relay HGN3 normally fit into marker sockets a' and b', respectively. Male pins a and b are removed from marker sockets a' and b' and inserted instead into male/female adapter 3 receptacles a" and b", respectively. In turn, male/female adapter pins a''' and b''' are inserted into marker sockets a' and b'.

While the illustrative embodiment has been described to implement the use of a "shadow" line appearance which has been located on the link link frame one horizontal group below that of the primary line appearance, it should be apparent that the shadow line appearance could as easily have been located one horizontal group above that of the primary line appearance, or in fact, at any convenient predetermined distance therefrom within the same vertical file of the line link frame. Where the shadow line is in the same vertical file as the primary line appearance it is assigned the same corresponding class of service on the line link frame. Thus, for example, where the primary line is accorded centrex service, the shadow line appearance will fall in the same customer group and will receive the same rate treatment. The two line hunt feature may, therefore, also be realized in centrex installations without the need of assigning any additional directory numbers. The saving of directory numbers in this manner may forestall the need for 5 digit dialing of centrex station numbers. Eliminating the need for additional directory numbers will also forestall an increase in the number of number group frames required to provide two-line hunting as well as enhanced calling services. The foregoing and other objects and features of my invention will be apparent to those skilled in the art without, however, departing from the spirit and scope of my invention.

What is claimed is:

1. The method of performing two-line hunting in a marker-controlled crossbar switching system having a number group frame for providing equipment locations corresponding to called directory numbers comprising
    retranslating the originally-called directory number to re-furnish the marker with the equipment location of the called line, and
    directly modifying one element of the equipment location so furnished to identify an auxiliary appearance of the called line.

2. The method of claim 1 wherein said modifying of said one element of said equipment location comprises registering in said marker an indication of the horizontal group number of the called line, and
    transferring the registered indication to seize a line in a horizontal group adjacent to that of the registered horizontal group number.

3. The method of claim 2 wherein the lines of said two-line hunting group are located in the same vertical crossbar switch file.

4. The method of performing two-line hunting in a marker-controlled crossbar switching system having a number group translator for providing the marker with the equipment location information corresponding to a called directory number, comprising
    storing in said number group an indication that a called line has an auxiliary appearance in the crossbar switch, and
    responding to the busy condition of said called line having said stored indication to modify in said marker one element of said translation information provided by said number group translator.

5. In a crossbar switching system having a number group translator which is seized by a switch-controlling marker to convert the directory number of called line to the physical location of that line's primary appearance on the crossbar switch frame, the improvement comprising
    means responsive to the called line being busy for reseizing the number group to retranslate the original called number, and
    means responsive to the said reseizing of the number group for modifying one of the elements of the physical location information furnished by said translation.

6. A switching system according to claim 5 wherein said means for modifying comprises means for directly decrementing one of the elements identifying said physical location.

7. A switching system according to claim 6 wherein said means for decrementing includes a relay chain path for operating a horizontal group seizure relay adjacent to the horizontal group number relay which was operated on the first seizure by said marker.

8. A switching system according to claim 5 wherein one of the translation elements furnished by said number group includes the ringing combination of the called line, wherein a distinctive ringing combination identifies a line to be accorded an auxiliary appearance feature, and wherein said means for reseizing said number group when said called line is busy includes means responsive to said distinctive ringing combination assigned to said called line.

* * * * *